(12) United States Patent
Swales

(10) Patent No.: US 6,982,953 B1
(45) Date of Patent: Jan. 3, 2006

(54) AUTOMATIC DETERMINATION OF CORRECT IP ADDRESS FOR NETWORK-CONNECTED DEVICES

(75) Inventor: Andrew G. Swales, Windham, NH (US)

(73) Assignee: Scorpion Controls, Inc., Hampton, NH (US)

( * ) Notice: Subject to any disclaimer, the term of this patent is extended or adjusted under 35 U.S.C. 154(b) by 714 days.

(21) Appl. No.: 09/614,489

(22) Filed: Jul. 11, 2000

(51) Int. Cl.
*H04J 1/16* (2006.01)

(52) U.S. Cl. ...................... 370/218; 709/220; 709/221; 370/245; 370/216

(58) Field of Classification Search ................ 709/203, 709/206, 208, 217, 226, 227, 228, 245, 225, 709/220, 221; 370/254, 218, 245, 216, 217, 370/466; 364/131; 714/25, 48

See application file for complete search history.

(56) References Cited

U.S. PATENT DOCUMENTS

| | | | |
|---|---|---|---|
| 5,432,907 A * | 7/1995 | Picazo et al. ............... 709/249 |
| 5,490,252 A | 2/1996 | Macera et al. .............. 709/206 |
| 5,526,489 A | 6/1996 | Nilakantan et al. |
| 5,751,967 A * | 5/1998 | Raab et al. .................. 709/228 |
| 6,047,222 A | 4/2000 | Burns et al. .................... 700/79 |
| 6,055,236 A * | 4/2000 | Nessett et al. .............. 370/389 |
| 6,061,739 A | 5/2000 | Reed et al. |
| 6,108,300 A * | 8/2000 | Coile et al. ................. 370/217 |
| 6,392,990 B1 * | 5/2002 | Tosey et al. ................ 370/218 |
| 6,532,088 B1 * | 3/2003 | Dantu et al. ................... 398/43 |
| 6,532,241 B1 * | 3/2003 | Ferguson et al. ........... 370/469 |
| 6,567,405 B1 * | 5/2003 | Borella et al. .............. 370/389 |
| 6,597,700 B2 * | 7/2003 | Golikeri et al. ............. 370/401 |
| 6,601,101 B1 * | 7/2003 | Lee et al. .................... 709/227 |
| 6,636,499 B1 * | 10/2003 | Dowling ..................... 370/338 |
| 6,654,796 B1 * | 11/2003 | Slater et al. ................ 709/220 |
| 2003/0217041 A1 * | 11/2003 | Mao .............................. 707/1 |

FOREIGN PATENT DOCUMENTS

WO WO 01/50711 A1 7/2001

OTHER PUBLICATIONS

Internet standard document RFC 951, Bootstrap Protocol (BOOTP), Sep. 1985, pp 1-12.
Internet standard document RFC 1531, Dynamic Host Configuration Protocol, Oct. 1993, pp 1-39.
Internet standard document RFC 1493, Definitions of Managed Objects for Bridges, Jul. 1993, pp 1-34.
EP Search Report dated Nov. 8, 2004 of Patent Application No. 00 96 0131 filed Jul. 11, 2000.

* cited by examiner

*Primary Examiner*—Khanh Dinh
(74) *Attorney, Agent, or Firm*—Maine & Asmus

(57) ABSTRACT

The present invention is for automatic reconfiguration of industrial networked devices. More particularly, the system described herein facilitates use of TCP/IP networks, such as Ethernet, as an alternative for industrial fieldbus or device buses by removing the need to perform significant reconfiguration of devices such as I/O modules, sensors, or transducers under field replacement situations. The present invention uses a monitor agent to track the IP and MAC addresses of networked devices as well as port information. If a device fails, maintenance personnel make an in-field replacement of the failed device and the monitor agent automatically reassigns the IP address to the replacement device.

24 Claims, 8 Drawing Sheets

1. ARP Request - inquire MAC address of selected IP address 1.2.3.6 (unicast)
2. ARP response - MAC address of requested IP address is xxx
If no response is received, signify that the target IP unit is 'down'
If 1.2.3.6 is the ONLY unit on port 3 of the switch which is down, then it is a candidate for automatic reallocation. If any of the other units found on this port are also down, automatic reallocation will be suppressed.

1. ARP Request - inquire MAC address of IP address w.x.y.z (broadcast)
2. ARP response - MAC address of requested IP address is xxx
3. SNMP Findport request - request port number of MAC xxx
4. SNMP Findport response - port number of MAC xxx was 3

1. ARP Request - inquire MAC address of selected IP address 1.2.3.4 (broadcast)
2. ARP response - MAC address of requested IP address is xxx
3. SNMP Findport request - request port number of MAC xxx
4. SNMP Findport response - port number of MAC xxx was 3

Targets are automatically determined to be sharing port 3 of the switch.

1. ARP Request - inquire MAC address of selected IP address (unicast)
2. ARP response - MAC address of requested IP address is xxx
If no response is received, signify that the target IP unit is 'down'

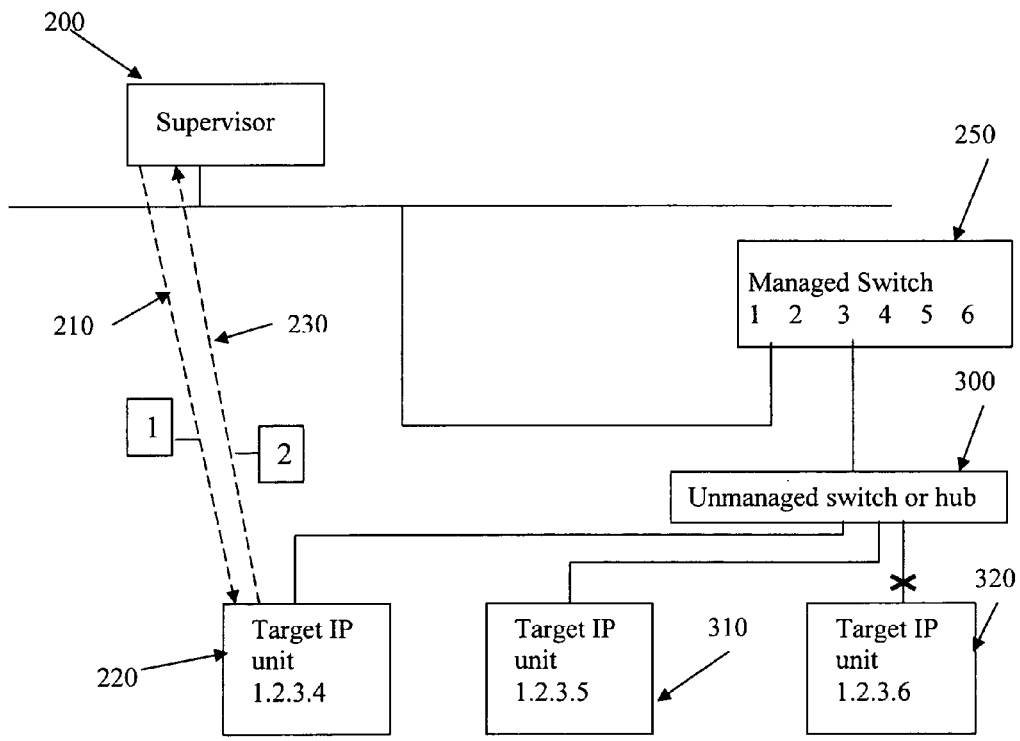

1. ARP Request - inquire MAC address of selected IP address 1.2.3.6 (unicast)
2. ARP response - MAC address of requested IP address is xxx
If no response is received, signify that the target IP unit is 'down'
If 1.2.3.6 is the ONLY unit on port 3 of the switch which is down, then it is a candidate for automatic reallocation. If any of the other units found on this port are also down, automatic reallocation will be suppressed.

FIG. 6

1. BOOTP request - please supply IP address for MAC xxx (broadcast)
2. SNMP Findport request - request port number of MAC xxx
3. SNMP Findport response - port number of MAC xxx was 3 (MAC xxx already associated with IP at that canonical location - OK to assign)
4. BOOTP response - IP address for MAC xxx is w.x.y.z

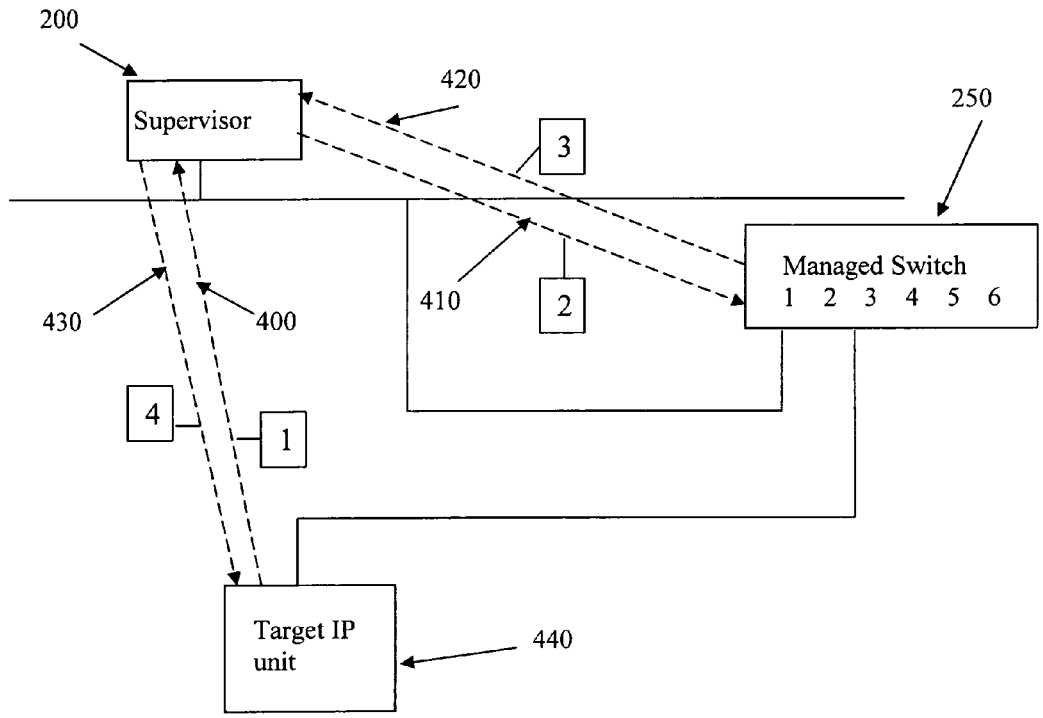

1. BOOTP request - please supply IP address for MAC xxx (broadcast)
2. SNMP Findport request - request port number of MAC xxx
3. SNMP Findport response - port number of MAC xxx was 3
(MAC xxx not known. However a single unit at that location is not currently responding. Update BOOTP equivalence table to record new IP assignment and authorize assignment)
4. BOOTP response - IP address for MAC xxx is w.x.y.z

FIG. 8

AUTOMATIC DETERMINATION OF CORRECT IP ADDRESS FOR NETWORK-CONNECTED DEVICES

TECHNICAL FIELD OF THE INVENTION

The present invention relates generally to networked devices. More specifically, the present invention relates to a system of assigning addresses to network devices, and more specifically, to a system encompassing automatic assignment of a network address after in-field replacement.

BACKGROUND OF THE INVENTION

Industrial devices such as temperature or pressure sensors are accessed by a client using an Internet Protocol (IP) Address or DNS symbolic name (machine.company.com). If a unit needs to be replaced, the replacement must appear to have the same IP Address as the predecessor to allow operations to proceed automatically. Typical maintenance personnel are not qualified to manipulate IP Addresses and must defer to Information Systems (IS) department or other network specialists. This causes a significant delay in connecting devices, which results in factory down-time. Alternatively, expensive specialists must be maintained around the clock to handle such problems.

The prior art encompasses several networking techniques. The Bootstrap Protocol (BOOTP) is an established method for assigning IP address and other key networking parameters to a device where the only information known about the device is its Ethernet Media Access Control (MAC) address. The protocol was invented by Sun Microsystems in 1985 to support diskless UNIX workstations. It is available as an option on most software products intended for use in embedded (no operator terminal) applications.

The Dynamic Host Configuration Protocol (DCHP) is a standard for networking communications. DCHP is a compatible extension to BOOTP and queries in DCHP form can be generated by devices using modern operating systems such as Windows CE or LINUX.

DCHP is primarily used for laptop computers or office systems in large companies where the addresses are 'leased' for a period of time rather than being assigned indefinitely. Likewise, the Simple Network Management Protocol (SNMP) is intended to allow Network Administrators to find and adjust key networking parameters on devices already installed on a network, particularly the routers, bridges, and hubs which form the infrastructure of the network. The JetAdmin Network Printer tool is a Hewlett-Packard system for reporting printer errors and administrating usage.

Reverse ARP (RARP) is an older protocol than BOOTP and intended for devices that did not require any configuration other than the IP address assignment. RARP is not as widely used as BOOTP because the tools to implement RARP are not as commonplace. RARP is implemented on some embedded system protocol stacks, wherein the supervisory server may respond with a RARP response if interrogated using a RARP request for a given MAC address.

The MAC address is a key identification parameter of all devices on a network such as Ethernet. It is a 48-bit number that combines information about the vendor and a unique unit sequence number, and is permanently allocated by the manufacturer of the network interface itself. It is not normally related in any way to the serial number or similar representation that a device might require for other reasons. The MAC address is conventionally expressed as a hexadecimal representation that is hard for non-specialists to handle. The Ethernet hardware uses the MAC address to determine which network messages are intended for specific delivery (unicast) to this station.

PING is another Internet protocol used for periodic interrogation of an IP device as an alternative to repeated use of the ARP request. There is little practical benefit for using PING, as the ARP messages are faster and less intrusive. All modern IP devices will respond to an ARP request because it is the only way to determine the MAC address.

An 'Ethernet Switch' or 'Layer 2 switch' is a device that transmits message packets unchanged from one of its ports to another, using rules that are dependent only upon the destination MAC address of the message. Such devices are becoming the preferred interconnection devices for large Ethernet networks, since they do not require significant configuration. This is as opposed to 'routers', otherwise known as 'Layer 3 switches'.

A 'Managed Ethernet Switch' is an Ethernet switch which includes a management entity conforming to the reporting requirements of RFC 1493, and which therefore specifically may be interrogated to determine which port of the device was used recently to receive a message from a particular MAC address.

The protocol exchanges between the system components, namely the device, the managed switch, and the target IP unit are structurally defined in various standards documents. Software designers refer to these specifications when trying to implement software that encodes or decodes various messages. The Internet Request for Comment (RFC) documents are the standard form of documents for all communications using the Internet or TCP/IP.

The following table defines the primary applicable Internet protocol messages:

TABLE 1

| ARP Request<br>See RFC 826 | ARP Response<br>See RFC 826 | SNMP Findport<br>Request<br>See RFC 1493/1157 | SNMP Findport<br>Response | BOOTP Request<br>See RFC 951 | BOOTP Response |
|---|---|---|---|---|---|
| Message type =<br>address resolution<br>request | Message type =<br>address resolution<br>response requested<br>IP Address | Message type =<br>SNMP get object<br>request | Message type =<br>SNMP get object<br>response | Message type =<br>BOOT protocol<br>request | Message type =<br>BOOT protocol<br>response |
| Desired IP<br>address =<br>32 bit IP address<br>(eg: 1.2.3.4) | Resolved MAC<br>address =<br>48 bit MAC address<br>(eg: 01:23:45:67:89:ab) | Object ID =<br>.1.3.6.1.2.17.4.3.1.2.<br>(MAC as 6 decimal<br>number 0–255) | Object ID =<br>.1.3.6.1.2.17.4.3.1.2.<br>(MAC as 6 decimal<br>number 0–255)<br>Object value = port<br>number, or 0 if not found | Requesting MAC =<br>48 bit MAC address<br>(eg: 01:23:45:67:89:ab) | Requesting MAC =<br>48 bit MAC address<br>(eg: 01:23:45:67:89:ab)<br>Assigned IP = 32 bit<br>IP Address |

Alternatively, other Internet protocols messages are:

TABLE 2

| PING Request See RFC 792 | PING Response | DCHP Request See RFC 2131/2132 | DCHP Response | RARP Request See RFC 903 | RARP Response |
|---|---|---|---|---|---|
| Message type = ICMP ECHO request Message data unimportant | Message type = ICMP ECHO response | Message contents = same as BOOTP | Message contents = same as BOOTP | Message type = reverse address resolution request MAC = 48 bit MAC address (eg: 01:23:45:67:89:ab) | Message type = reverse address resolution response MAC = 48 bit MAC address (eg: 01:23:45:67:89:ab) Assigned IP = 32 bit IP Address (eg: 1.2.3.4) |

There have been numerous attempts to provide an automatic addressing system. Many of the prior art systems employ non-IP means to set the address in advance, such as manually alterable switches, special connectors, front panel interface for manually entering addresses, and separate serial port interface for issuing an address. Although these existing means are satisfactory in some instances, they do not adequately address the industrial or factory market for devices such as sensors and I/O devices. And, it is not feasible or cost-effective to employ the existing addressing techniques into certain devices or certain environments.

Historically, almost all devices which have been attached to a TCP/IP network have been computer systems of some type, either of a 'conventional' (with keyboard and display) or 'embedded' (such as a network printer) type.

In order to make a TCP/IP device functional on a network, it is necessary to assign certain address parameters, most importantly the 32-bit IP address. In many cases additional parameters such as netmask, gateway, and Domain Name Server settings also need to be established. These settings are important for proper performance, otherwise the network becomes unstable and exhibits erratic behavior affecting the performance not just of the device being configured, but also other devices on the network.

The typical prior art sequence for manual assignment of the IP address and other networking parameters begins with the direct assignment of the IP Address using a local data entry port prior to attachment on the network. This is normally accomplished through the operator panel or user interface. The operator assigns the IP address by keystroke and confirms the settings before allowing communication on the network.

One prior art method of automatic assignment of IP addresses uses BOOTP or DHCP. The BOOTP or DCHP techniques require that a database be maintained separately that associates the 'MAC address' of the device to be attached with the required IP address and other parameters. This database is created and maintained by the network specialist and requires considerable skills that would not be held by the typical field replacement technician. In addition, DHCP cannot be used conventionally, to assign an 'unpredictable' address within a 'pool' of available addresses, because the primary network protocols between industrial devices, such as Modbus/TCP, use explicit knowledge of the IP addresses of the designated targets. For example, when DHCP is used on systems using Windows NT Server, the option known as 'IP address reservation' is typically used. This actually makes DHCP equivalent to BOOTP in this embodiment.

This prior art invention uses a central BOOTP or DHCP server to maintain a list of MAC addresses and IP addresses in a central location and allows acces by the experienced network or system administer to manage the lists. Although this protocol is implemented by many devices, the assignment must be done by the IS department or system administrator. In a factory environment with automated devices running 24 hrs a day×7 days a week, employing a system administrator to assign IP addresses on devices around the clock is not cost-effective. The technician or engineer replacing the device does not possess the adequate skill or knowledge to also assign the IP address, and having a device failure may cripple the plant operation. Businesses must minimize the downtime associated with field replacement of devices in order to make the production numbers. Delaying a factory line until a system administer can issue an IP address to the device is not a satisfactory option in the highly competitive marketplace.

Another prior art system of assigning IP addresses is done via indirect assignment using static address resolution protocol (ARP) override. The device is designed to 'assume' that any IP message arriving at the device that includes a MAC address that matches that of the device implies the registration of the IP address in the target. This forces the IP address sent to the device to be adopted by the device even if it is already in use. It also requires matching of the MAC address to the particular device. As noted herein, forcing the wrong IP address to a device on the network can result in unexpected catastrophe.

Typically the ARP override method involves an operator sequence at a management station such as:
  arp-s 10.0.0.1 00:00:54:ab:cd:ef
  ping 10.0.0.1

This forces the local station to build a directed unicast message to the Ethernet address 00:00:54:ab:cd:ef and designate the IP address as 10.0.0.1. This is interpreted by the device with address OO:00:54:ab:cd:ef as authority to assign the IP address 10.0.0.1 Any internet protocol can be used during the second phase. Instead of PING, it is common to use TELNET on obscure port numbers in an attempt to avoid 'accidental' reconfiguration.

There are also alternative network protocols for devices, such as HP JetDirect cards. The HP JetDirect cards use the IPX protocol to advertise their presence to any management station on the local network. A management program running on some station on the local network picks up the advertisement and displays the device as requiring configuration to the operator. Since typically only one station at a time on a network will be in an unconfigured state, this allows the operator to recognize and select that unconfigured device without recording the MAC address. All of these mechanisms require either knowledge of the MAC address of the device being attached, or at least specialized knowledge of the desired network function of the device by an operator. Use of an alternative protocol such as IPX will cause problems in use of the devices in environments where these protocols are not supported.

All the referenced techniques of IP Address assignment require either knowledge of the MAC address of the device being attached, specialized skills and training, or preferably both. IPX protocol implementations has some further inherent difficulty with devices not supporting IPX protocols on the network.

Industrial control devices pose particular problems because of the importance of operation, continuous operation, and location of the devices. These devices may fail in service and must be replaced rapidly from a spares stock with minimum Mean Time To Repair (MTTR). For example, the devices may fail because they are exposed to electrical or mechanical stresses that exceed their specifications. An example of a mechanical stress is being crushed by impact with a fork lift truck. A common example of an electrical stress is 110/220 V line power being shorted to low voltage input circuits. In such situations, the devices are usually designed to 'go safe', but they need to be replaced as rapidly as possible in order to allow the process to continue.

Most industrial users maintain a stock of spare devices of each type that need to be replaced. These users provide instructions to maintenance personnel for replacement of faulty devices. However, the need to assign IP addresses accurately under such critical replacement conditions is usually not practical. This is particularly true in industrial environments with strict responsibility partitioning between an electrician who can rewire a module, but requires the service of an IT technician to alter network parameters.

Previously, Ethernet was not considered a viable option to the business community. One problem with the implementation of Ethernet as a replacement for the device level networks such as ASi or DeviceNet was that you could not require anything more elaborate than the setting of a rotary switch to match the predecessor device. Such problems diminished as the protocols changed and expanded the Ethernet options.

One such protocol the industrial protocol MODBUS/TCP. MODBUS/TCP is a communication protocol designed to allow industrial equipment such as Programmable Logic Controllers, computers, operator panels, motors, sensors, and other types of physical input/output devices to communicate over a network. It was introduced by Schneider Automation in the early 1990's as a variant of the widely used MODBUS protocol, which had been implemented in turn by almost all vendors and users of automation equipment. The specification of the MODBUS/TCP variant was published on Schneider's web site, in order to encourage all vendors to implement the protocol consistently, and thus avoid interoperability problems that typically result when implementors must 'deduce' or 'reverse-engineer' an interface specification.

There have been several attempts to resolve the aforementioned problems. U.S. Pat. No. 5,410,730 ('730), discusses automating the initial assignment of a process device address by allowing a number of devices to be attached to the network, issuing queries to which all devices will respond, and then using unique parameters or serialization included in those devices before installation to assist an operator in assigning the network address.

The mechanism of the '730 patent requires foreknowledge of the unique characteristics of the device in order to provide address assignment, and cannot be used to perform automated assignment when replacing one of potentially many identical devices on a network segment. It is also not designed to work with TCP/IP local area networks. The mechanism of assigning a temporary address first, and then using that to complete the configuration process, is only necessary when using networks which have no native bootstrap address assignment process. In the case of a TCP/IP local area network, all of this functionality can be done using the Internet standard BOOTP protocol (RFC 951). With BOOTP, the information needed to perform the match is the serial number or 'MAC address' that is uniquely associated with the network interface hardware and readily available upon request.

U.S. Pat. No. 5,724,510, ('510) describes a technique which would most likely be banned in any practical Internet TCP/IP local area network because it assigns an address for a device by using speculation. Specifically, it deduces the range of addresses in use on the network to which the device is attached, and then issues a series of queries to determine whether a given address within that range has already been assigned to another device. The novelty claimed in the '510 patent is that in addition to the standard ARP technique ordinarily used to query the existence of a given IP address, the '510 system extends this by issuing a series of 'application level' queries. The reason for doing this is to overcome problems relating to the 'cacheing' of ARP records.

A flaw in the '510 invention is that it fails to address the case where the address being speculatively assigned has in fact already been assigned to another device, but that device is temporarily inaccessible, such as by being reset or through a temporary network disruption. The '510 system would complete its assignment of the duplicate address in a finite time period, after which, if the original device were to come back on line, there would be a duplicate address situation that would impede operation of the original device. This flaw supports the conclusion that it would likely never be permitted on a network used for automation purposes, as multiple devices with the same IP address would result in grave networking problems. A more appropriate solution to the assignment of an arbitrary address on a network is to use the Dynamic Host Configuration Protocol (DHCP) described in RFC 1531.

The invention of U.S. Pat. No. 5,446,897 ('897) allows for the assignment of the network address for a replaced device, automatically, by recognizing a unique 'logical identifier', or an 'arbitrary word, number, or combination thereof'. One application of this '897 patent is the replacement of one of many identical devices on a network. Maintenance personnel set a plurality of switches or jumpers that are accessible on the device so that they have an identical setting to that on the device being replaced. Once completed, the application technique described in the '897 patent completes the replacement.

There are several limitations of technique of the '897 patent. Firstly, it requires that the devices being replaced incorporate the capability of reading some sort of 'logical identifier' before attempting address assignment. Secondly, the devices being replaced must incorporate a non-standard protocol capability to transmit that information to the management device for the purpose of address assignment. These two requirements severely limit the usefulness of the technique, since network administrators would be unwilling to deploy an automated configuration technique unless it applied to a high proportion of devices likely to require such assignment. Any attempt to make the requirements into a standard would require agreement among multiple vendors of equipment to adopt this additional feature voluntarily. Such cooperation would likely not succeed. The appropriate way of achieving such agreement is to propose the technique and get it adopted by a standards body such as the Internet Engineering Task Force (IETF). However, the IETF would be skeptical about the widespread adoption of such a technique because of its similarity to the BOOTP and DHCP protocols already available. In fact, the '897 patent describes a technique identical to the prior art of BOOTP, where the logical identifier is the MAC address.

A system for allowing decentralization of a directory previously maintained on a single file server is described in U.S. Pat. No. 6,021,429 ('429). Decentralization and resilience is achieved by arranging the 'list servers' to follow a defined protocol for determining the existence of list servers on a network. And, updating their contents from one of the devices whose contents are authoritative in order that any of the devices can serve the information in the case of unavailability of the original.

This '429 technique has much in common with the distributed 'Yellow Pages' database implemented on Sun Microsystems workstations dating back to the mid 1980's. The primary difference is that the identity of a device being available to take on directory service duties need not be configured in advance. Instead, the devices negotiate for authority based upon their assigned network addresses. This in turn is similar to the procedure used by Microsoft in implementing the 'automatic browse master assignment' for Windows 95 peer to peer file service. Indeed, almost all of the described capabilities have an equivalent in the 'browse list' feature maintained automatically by Windows 95 machines, and which is updated by notification messages sent out on a timed basis by network devices such as printers, computers, and other file server devices.

Similar to '510 patent, the invention of U.S. Pat. No. 5,586,269 ('269) discloses a mechanism that is concerned with assignment of an arbitrary network address that allows the device to become functional on the network. This is accomplished by attempting to contact the existing devices that have been assigned the proposed addresses, in turn, until one is found that is not currently assigned.

The '269 mechanism is not appropriate for use on a TCP/IP local area network because of the problems caused if the address in question actually had been assigned to another device, but that device was temporarily inaccessible. Such a situation would likely cause network disruption and possibly a failure of control in an automation system. Therefore, the '269 methodology would not be acceptable on a network used for automation purposes. Instead, the appropriate protocol to use if an arbitrary address were desired on a TCP/IP local area network is the standard DHCP protocol described in RFC 1531.

The techniques of U.S. Pat. No. 4,677,588 ('588) are not appropriate for TCP/IP local area networks. Assigning appropriate address ranges for network segments which are subsequently linked together is cumbersome, and cannot generally be overcome by defining an address assignment protocol that would be binding upon the existing devices on those networks. The existing TCP/IP devices expect stability in address assignment, and the act of interconnecting two networks cannot by itself, cause reassignment of network addresses without knowledge of the devices themselves. The '588 patent describes a mechanism for more convenient allocation of addresses in a network environment that is not bound by the address assignment conventions of TCP/IP.

U.S. Pat. No. 5,987,524 ('524) describes what is commonly called a network firewall technique to overcome an intended intrusion attack using 'address spoofing'. The firewall is pre-configured with an association between the physical address of each subscriber device and the IP address assigned to that device. The firewall recognizes the case where an incorrect source network address is being presented by an intruding system, and prevents the messages from being propagated to their intended target device.

The invention of U.S. Pat. No. 5,980,078 ('078) allows a general-purpose network to be used as part of a bootstrapping mechanism to enter the initial configuration data for a device after it has been physically installed on a network, but before it has been made operational. The '078 mechanism is specifically unsuitable for use with arbitrary target devices on a TCP/IP local area network since it relies on assignment of a temporary network address, and a non-operational state known as 'standby', in order to allow the device configuration to be completed with manual assistance.

The invention described in U.S. Pat. No. 5,917,808 ('808) is similar to that used in many commercially available network monitoring and system management tools, including ones which have been available on local area networks for more than a decade. Passive monitoring of network traffic to determine the identity and detail configuration of devices is a standard network management and troubleshooting procedure taught to network engineers. Building up a list of discovered devices in a database and displaying the contents of such database on demand is a standard feature of products such as 3Com Corp's 'Transcend' management package.

The '808 technique is not appropriate to the problem of automatic reassignment of network IP addresses when a target device is replaced in service, because under those conditions there would be no broadcast traffic to be monitored. In particular, use of Ethernet switching devices on modern networks severely impedes the value of passive monitoring, since only messages designated as 'broadcast' or 'multicast' are made available by the switches for monitoring by parties other than the direct participants of the communication.

The invention of U.S. Pat. No. 5,845,081 ('081) is concerned with gateway devices that must allow access to information using 'foreign' networks. Specifically, by detecting the existence of one or more authoritative devices on the foreign network (the 'target nodes'), and making queries upon them, the target nodes will divulge information which can be assembled by the gateway in order to ease the configuration of such gateway. This includes pre-assignment of network address equivalence tables or similar data.

A method of allocating addresses on devices without using manual adjustment of switches is described in U.S. Pat. No. 5,680,113 ('113). The '113 patent system does not use switches, relying instead on a known rearrangement of the wiring of an extension cable or connector when connecting such devices in series.

Actually, this '113 mechanism is akin to that used by Modicon Corp (now part of Groupe Schneider) on a product line known as '800 series I/O' introduced with the 884 model Programmable Controller in 1984. In that product, and for exactly the reason mentioned in the patent, the address of one of many modules in a modular I/O rack was determined by a combination of its rack number and slot number within the rack. To allow the racks to be physically identical parts and yet distinguishable in service, the interconnect cable performed a 'rotation' of the assignment of 5 signals. The effect of this was that the signals being presented to modules in the individual racks were detectable by the device, and this supplanted the need for any address switches.

U.S. Pat. No. 6,012,088 ('088) describes a technique similar to BOOTP, in which a unique registration number known to the internet access device is presented to a known registration service, which can be accessed without requiring pre-configuration of the device, and obtaining any configuration data from that device. The '088 invention relies on the existence of a known network service access point on the Public Switched Telephone Network, so the initial contact with the registration service can be done using only a previously recorded telephone number and modem settings. From that point onwards, any complex configuration settings can be automated based upon details previously registered in the database or negotiated with the equipment.

Devices that make use of this '088 technique must be specifically designed to do so, because the protocols used are non-standard. The non-standard mechanism is required to handle the case where the device being installed is not on the same local area network as the registration server. If it were on the same network, the same results could have been obtained using the standard protocol BOOTP.

In sum, the problem with prior art systems is that they require involvement of a specialized administrator to oversee the part replacement in order to properly configure the network address. The prior art does not have a simple yet disciplined method to automatically designate proper IP addresses while maintaining the highest level of system integrity. What is needed is an automatic network address assignment system. Such a system would decrease the mean-time-to-repair (MTTR) and allow for field replacement of networked devices without incurring the expense of having a network professional administer the address configuration. Ideally, such a system would use management information gathered from Ethernet switches to deduce physical location information, using such information to deduce the appropriate network address.

SUMMARY OF THE INVENTION

The present invention is a system for the automatic reconfiguration of Industrial Internet Devices. More particularly, the present invention facilitates the use of TCP/IP networks, such as Ethernet, as an alternative for industrial fieldbus or device buses.

Accordingly, one object of the invention is to automate the reconfiguration of devices such as I/O modules, sensors, or transducers under field replacement situations. In one embodiment this is achieved by combining available Internet standard techniques along with a system management software component. The latter is referred to as the 'management entity'.

The present invention encompasses various algorithms and software running on a standard computer, such as a file server or administrative workstation, that periodically polls the status of network devices. One object of the invention is to detect a failed network device that has been replaced, wherein the system automatically assigns the network address of the previously failed device. In one embodiment, the computing means is a dedicated monitor system in the form of a networked device that is installed in the same plant area and by the same personnel as the automation equipment it is supporting. Alternatively, the computing means encompasses functionality extensions to the managed network switches themselves.

Another object of the invention is the prompt identification of networked devices that have failed in service, so that maintenance personnel can be dispatched rapidly to effect the replacement. This is a consequence of the constant monitoring of the devices over the network.

A further object of the invention is a simplified initial configuration and set-up of the replaced equipment by using physical port numbers on a managed Ethernet switch rather than the less convenient MAC address numbers to identify the networked devices.

One of the distinctions between the present invention and many of the prior art systems is the use of management information from a Managed Ethernet switch to deduce physical location information or using that information to deduce a network address. There is also no mention in the prior art of the use of information from a management entity on a Managed Ethernet switch or similar device to deduce the appropriate network address to use when replacing a device.

In distinction to the '897 system, the present system requires no change to the network protocol capabilities of the target device, other than that it support the standard BOOTP address assignment protocol. There is no need to make accessible external switches or similar mechanical means which can be a source of additional cost, complexity, and unreliability. The determination that the device is an intended replacement, and thus should be reassigned a previously recorded address, is obtained by automated query to the management entity of an Ethernet switch or similar device to which the network cable is connected. The act of connecting the new device to the same cable or port as the original one provides the equivalent function to the 'logical identifier' in the previous patent.

In distinction to the '427 patent, the mechanism for obtaining the network address information for the present invention is via the standard ARP protocol described in RFC 826. The present invention interrogates the existing target devices themselves after having determined that the device is amenable to automated maintenance by querying a managed Ethernet switch or similar device and confirming that the device in question is in an area of the network that has been pre-configured for such automated maintenance.

The present invention, in contrast to '078, allows unmodified TCP/IP target devices, implementing only the address assignment protocol BOOTP to be configured without human assistance, and it deduces the address assignment using information from a standard managed Ethernet switch.

In distinction to '808, the present invention, uses location data obtained from a managed Ethernet switch or similar device to confirm the equivalence of a newly installed device to its failed predecessor, and allows the communication of the new IP address using the standard BOOTP protocol.

The present invention performs the IP address assignment of a replacement device, and uses physical location data obtained from a standard managed Ethernet switch to provide guidance for such network IP address assignment, neither of which is mentioned in the '524 patent.

In contrast to the '081 invention, the present invention is not concerned with operating gateways to foreign networks. The address information that needs to be maintained in order to perform IP address replacement is obtained without the assistance of designated target devices from which the address information can be obtained. Rather, address information is deduced using physical location information maintained by the standard managed Ethernet switch equipment for the benefit of human operators. There is no mention in the '081 patent of physical location data obtained from a standard managed Ethernet switch to provide guidance for network IP address assignment when replacing devices in the field. Likewise, there is no relevance of the '113 technique to the reassignment of network IP addresses in a TCP/IP local area network.

By contrast to '088, the technique of the present invention allocates replacement IP addresses for standard TCP/IP target devices automatically, communicating them to the device using the standard BOOTP protocol. The address assignment is determined with the assistance of management information obtained from a standard managed Ethernet switch supervising the network.

The present invention benefits from the standards relating to RFC 951 Bootstrap Protocol (BOOTP) and RFC 1493 SNMP support for Ethernet switch devices, in addition to RFC 2108. By using the international standards, all devices under the standard respond in the same manner. The present invention combines these widely implemented standards with unique methods and along with a novel software management entity to supervise them. As DCHP is compatible with BOOTP, if the query is determined to be DCHP, the DCHP form of the BOOTP response can be used.

A further feature of the present invention is that the network may be deployed in such a way that every target IP unit has a dedicated line to a port on a managed switch. In this case, there are no issues of ambiguity of replacement unit identity. Alternatively, the managed switches may be deployed on a more selective basis and utilize less expensive unmanaged switches or repeating hubs as the interface for the target IP units. In this scenario, the managed switch encounters more than one MAC address associated with one managed port on a switch. It is therefore necessary to restrict auto-reassignment of addresses to the case where the number of failing target IP units in the given managed plant area is exactly one.

One of the benefits of the present invention is the ability to recognize failed networked devices and automatically assign proper IP addresses to diminish down-time. Additionally, the methodology locates the physical location or region of the networked devices allowing for ease of finding a failed device. The present invention also deals with the authority of the system to assign IP addresses only if a single unit is determined to be replaced. If the system cannot isolate to a single failed network device, the automatic assignment is suppressed.

An object of the invention is a system for field replacement of networked devices, comprising the steps of detecting a failed networked device, replacing the failed networked device with a functioning networked device, locating a canonical location of the functioning networked device, issuing an IP address to the functioning networked device, wherein the IP address is identical to the IP address of the failed networked device.

A further object is for a system, wherein the step of detecting the failed networked device is accomplished by a unicast ARP request. Additionally, the step of detecting the failed networked device is accomplished by periodic ARP requests. An object also includes a system, wherein the step of detecting a failed networked device comprises processing a plurality of ARP requests over a time period before indicating the failed networked device.

An additional object is a system, further comprising a step of notifying maintenance personnel of the failed networked device.

An object of the invention is a system, wherein the step of locating a canonical location of the functioning networked device comprises the steps of requesting a MAC address for the functioning networked device and requesting a port number for the MAC address from a managed switching device, wherein the port number is the canonical location of the functioning networked device.

Another object is a system, wherein the step of locating a canonical location of the functioning networked device comprises the steps of identifying a plurality of target devices at the canonical location, comparing the canonical location of the functioning networked device with a database containing information of all the networked devices to isolate a single failed networked device at the canonical location. Also, a system, wherein the step of issuing an IP address to the functioning networked device is suppressed if unable to isolate to a single failed networked device.

An object of the invention is for a method for determining a canonical location for a plurality of networked devices, comprising the steps of maintaining a list of IP addresses for each of the plurality of networked devices on a monitor agent. Requesting and retrieving a MAC address for each of the plurality of networked devices. Maintaining a list of MAC addresses for each of the plurality of networked devices on the monitor agent. Requesting and retrieving a port number on a switching device for each MAC address. Maintaining a list of port numbers for each of the plurality of networked devices on the monitor agent. Processing the canonical location for each of the plurality of networked devices.

An additional object is a method, wherein the monitor agent comprises a computing means and a memory means.

Additionally, an object includes a method, wherein the switching device is a managed switching device and the port number is dedicated to the networked device and is the canonical location. Alternatively, an object is for a method, wherein the switching device is an unmanaged switching device and the port number is shared among a plurality of target devices.

An object of the invention is a method for detecting a canonical location for a failed network device, comprising the steps of requesting a MAC address for each of a plurality of networked devices. Detecting the failed network device and processing the MAC address for the canonical location of the failed network device. Finally, logging the MAC address, the canonical location, and an IP address for the failed network device.

The objects include using a unicast ARP message to a select IP address.

Another object is a method, wherein the step of detecting the failed network device is based on no responsive from the requesting step.

An additional object is for a method, further comprising a step of notifying maintenance personnel upon detecting a failed network device.

Additionally, a method wherein the step of requesting a MAC address is periodic.

An object includes a method, wherein the step of processing the MAC address for the canonical location comprises accessing a database containing a MAC address listing, an IP address listing and a port listing for each of the plurality of networked devices, and wherein a port number represents the canonical location of the failed network device.

Yet another object is a method wherein the step of processing the MAC address for the canonical location comprises accessing a database containing a MAC address listing, an IP address listing and a port listing for each of the plurality of networked devices, and wherein a port number, represents the canonical location of a plurality of target devices, and the IP address of the failed network device is determined by locating a single failed target device at the canonical location.

An object of the invention is an apparatus for the automatic configuration of networked devices, comprising a network interface interconnecting the networked devices, a means of detecting the networked devices, a means of determining a canonical location of the networked devices, and a monitor agent connected to the network interface, wherein the monitor agent issues an IP address to each of the networked devices and records a MAC address for each of the networked devices and wherein the monitor agent maintains a list of each IP address and each MAC address.

A further object is an apparatus further comprising a means of processing a new IP address for a new networked device, wherein the new IP address does not conflict with the IP address list maintained by the monitor agent.

And yet another object is an apparatus wherein the means of detecting the networked devices is accomplished by a periodic unicast ARP request.

An object also includes an apparatus wherein the means of determining a canonical location of the networked devices comprises a means of processing a port number for the MAC address from a managed switching device.

A final object is an apparatus, wherein the means of determining a canonical location of the networked devices comprises a means of processing a plurality of target devices at the canonical location.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

FIG. 6 Diagrammatic view of confirm presence for shared port

FIG. 8 Diagrammatic view of IP Address reassignment

DESCRIPTION OF THE PREFERRED EMBODIMENT

Figure 1:
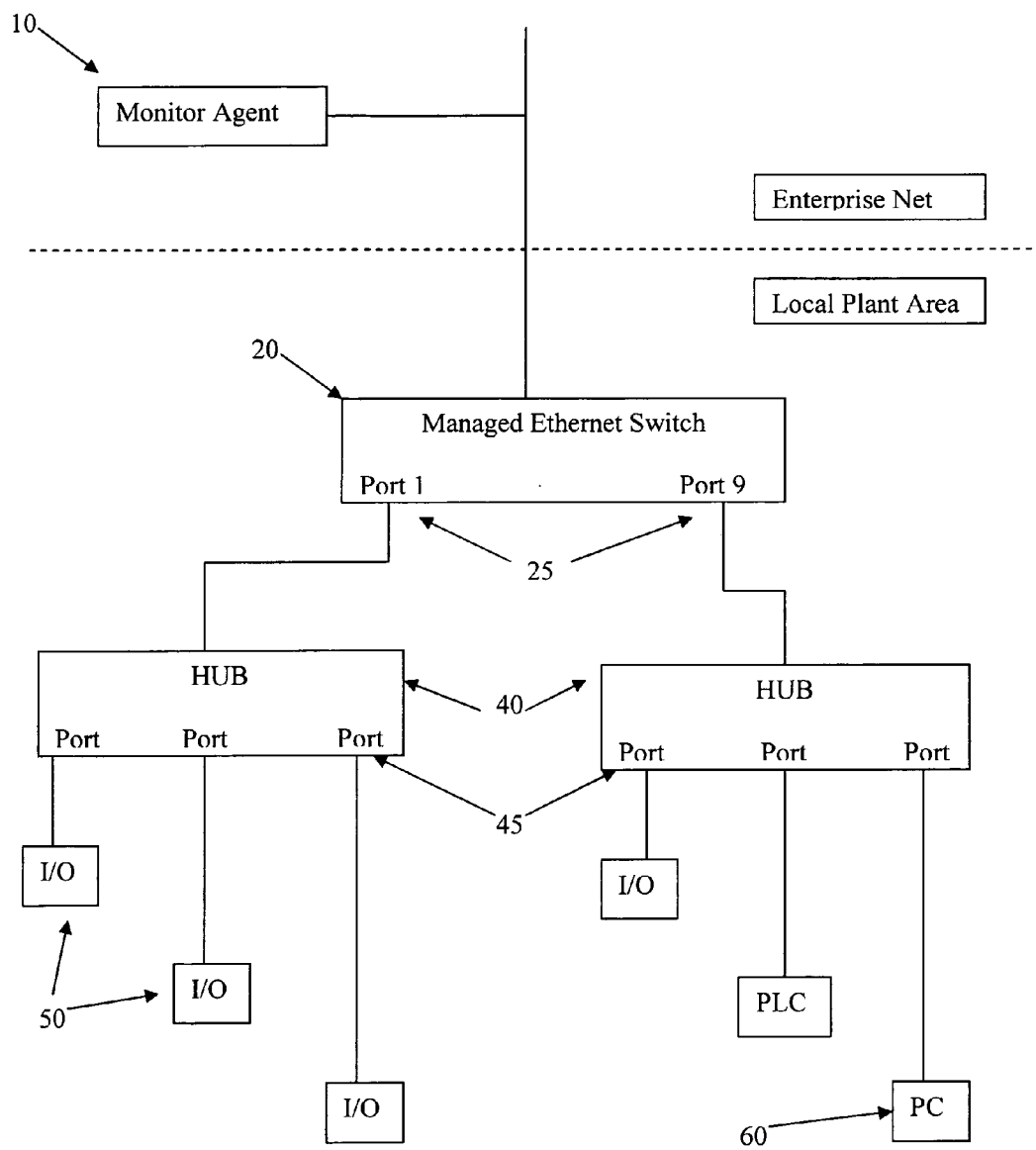
FIG. 1 Basic block diagram showing interconnected elements

One embodiment of the present invention is referenced in FIG. 1. There is a monitor agent 10 that serves as the BOOTP server and comprises computing means for managing and processing the network data and a memory means for storing information. The monitor agent 10 is connected to a network having one or more managed switches 20. The managed switches 20 are considered to be on the local plant area. There are multiple ports 25 on the managed switch 20, and it is capable of reporting MAC addresses and/or port assignments.

In a preferred embodiment, the TCP/IP network is Ethernet and uses Ethernet managed switches 20. It should be understood that the term network refers to any communication exchange and not a specific type of connection.

Connected to the managed switch 20 is a number of inexpensive hubs 40 with a number of hub ports 45. Connected to these hub ports 45 are a plurality of devices, such as I/O devices 50 and other elements such as a computer 60.

Each device connected to the hub ports 45 has an associated MAC address and an associated IP address. The managed switch 20 reports all MAC addresses and port assignments associated with the hubs and devices connected to the monitor agent 10. The monitor agent 10 maintains a list of all port assignments and MAC addresses. Thus, not only does the monitor agent 10 know the MAC and IP addresses of an individual device, but it also knows the approximate location by knowing to which port of a Managed Ethernet Switch 20 the device is connected.

The local plant area refers to the system of devices located from a managed Ethernet switch 20 and downwards, including all hubs and I/O devices interconnected therein. The monitor agent 10 exists in an enterprise net, and records all IP and MAC combinations found in the local plant area.

Figure 2:
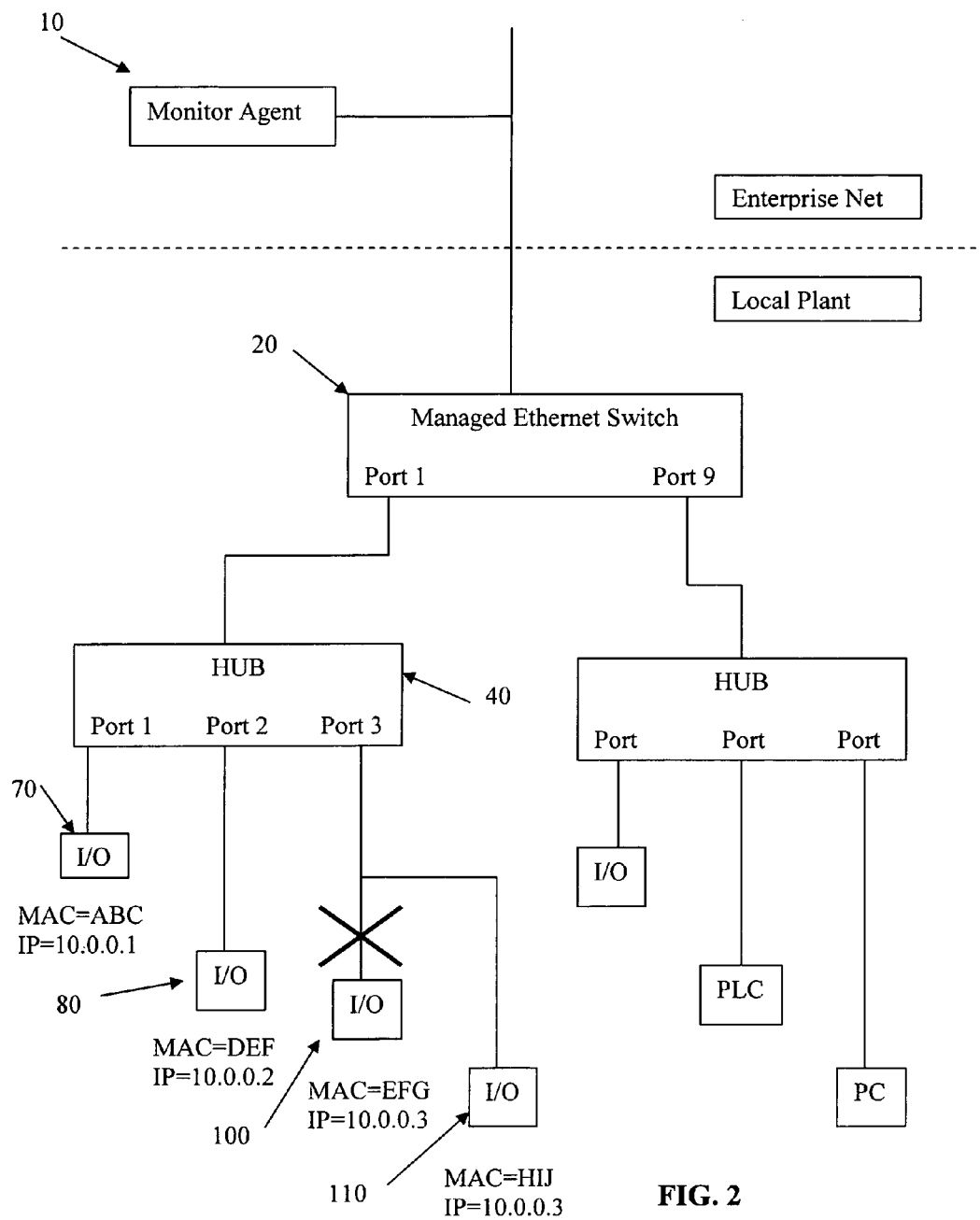
FIG. 2 Block diagram illustrating replacement situation

Referring to FIG. 2, each of the working devices 70, 80 connected to the hub 40 has a MAC address and an IP address. The failed or malfunctioning unit 100 also had a MAC address and IP Address. Based on periodic device polling, the information of a failed unit has already been communicated to the monitor agent 10 through the managed switch 20. The monitor agent 10 also lists the failed device 100 as being located on managed switch Port 1.

From an overview perspective, as soon as the failed device 100 is replaced with a working device 110, the working device 110 requests a network assignment. The monitor agent 10 notes the request, and determines if the request originates from the location of the previously detected failed unit 100. If the request comes from Port 1, the monitor agent 10 issues the same IP address as the previous device and the new device 110 begins operating on the network.

More specifically, the monitor agent 10 maintains a database of all MAC addresses for each device on the network. This BOOTP database is built and maintained automatically, by the monitor agent 10 that takes advantage of the MAC address detection scheme built into modern Ethernet switch devices. Using this capability, which is referred to as the SNMP FindPort query and is defined by RFC 1493, it is possible by issuing SNMP requests from a management program to track down a particular MAC address and identify on which port of which switch it is found.

The IP addresses of the various devices are also maintained by the monitor agent 10. Actually, the monitor agent 10 issues the IP address to each new device. In operation, all devices are set to request their network assignment, or IP Address, at power up using the standard BOOTP protocol. In a preferred embodiment, the devices perform the request multiple times, such as 3 or more, over a 'reasonable period' such as 15 seconds. If a response is obtained from a BOOTP server entity on the network, then the IP address and other returned parameters will be used by the device. In addition, the IP address information may be recorded locally, so that in the event that the device subsequently powers up WITHOUT the BOOTP server being available, it will fall back to the last known good address.

If the device has an address recorded already, and the address returned using BOOTP is different, then the newly obtained address is used and recorded. The present invention thus handles the case where a unit is swapped out, tested, found to be operable, and returned to spares stock, but it has not been completely initialized in the process.

MAC addresses are conventionally expressed as a hexadecimal number with 12 digits, in the form 'ab:cd:ef:01:23:45'. The expressions 'ABC', 'DEF' etc in the figures are a simplification to avoid distracting the reader. Referring again to FIG. 2, as an example—a first I/O device 70 has a MAC address=ABC, a second I/O device 80 has a MAC address=DEF, and a third I/O device 100 has a MAC address=EFG. The MAC addresses were previously detected and recorded by the monitor agent 10. The monitor agent 10 also records and issues the IP addresses for each device. Thus, first I/O device 70 has an IP address of 10.0.0.1, the second I/O device 80 has an IP address of 10.0.0.2, while the third I/O device 100 has an IP address of 10.0.0.3. The monitor agent 10 identifies each of these I/O devices 70, 80, and 100 as coming from Port 1 of the managed switch 20.

The monitor agent continually polls the I/O devices 70, 80, 100, and when a device malfunctions the device either issues commands indicating a failure, sends back a malfunction or error code in response to the poll, or ceases to respond at all. The failure information can be forwarded to the appropriate maintenance department. In the present example, device 100 fails.

Once the maintenance personnel have successfully removed the faulty unit 100 and installed a replacement device 110, the replacement device 110 issues a BOOTP request. The monitor agent 10 receives the BOOTP request and determines if the managed switch 20 port location of the replacement device 110 coincides with the location of the present BOOTP request. If the monitor agent 10 determines that the replacement device 110 is replacing the malfunctioning device 100, it issues the same IP address to the replacement device 110.

For example, the replacement device 110 with a MAC address of HIJ issues a BOOTP request which is transmitted through the hub 40 port 3 and through the managed switch 20 port 1 to the monitor agent 10. The monitor agent determines which port of the managed switch the BOOTP request originated. Once it is determined that the failed unit and the BOOTP request came from the same port of the managed switch 20, the replacement device 110 is designated with the same IP address as the failed unit 100 and assumes the IP address 10.0.0.3. The replacement device 110 is thus quickly established on the network. The monitor agent 10 then continues to poll the units for status.

In one embodiment, a managed switch is used in lieu of the hub 40, so that the monitor agent 10 can track the port designations from each layer of the network. In another embodiment, the monitor agent itself may be duplicated on the network, so that in the event of failure of the hardware or networking infrastructure leading to the monitor agent 10, another monitor agent with visibility into the same local plant area would be able to take over its duties.

Figure 3:
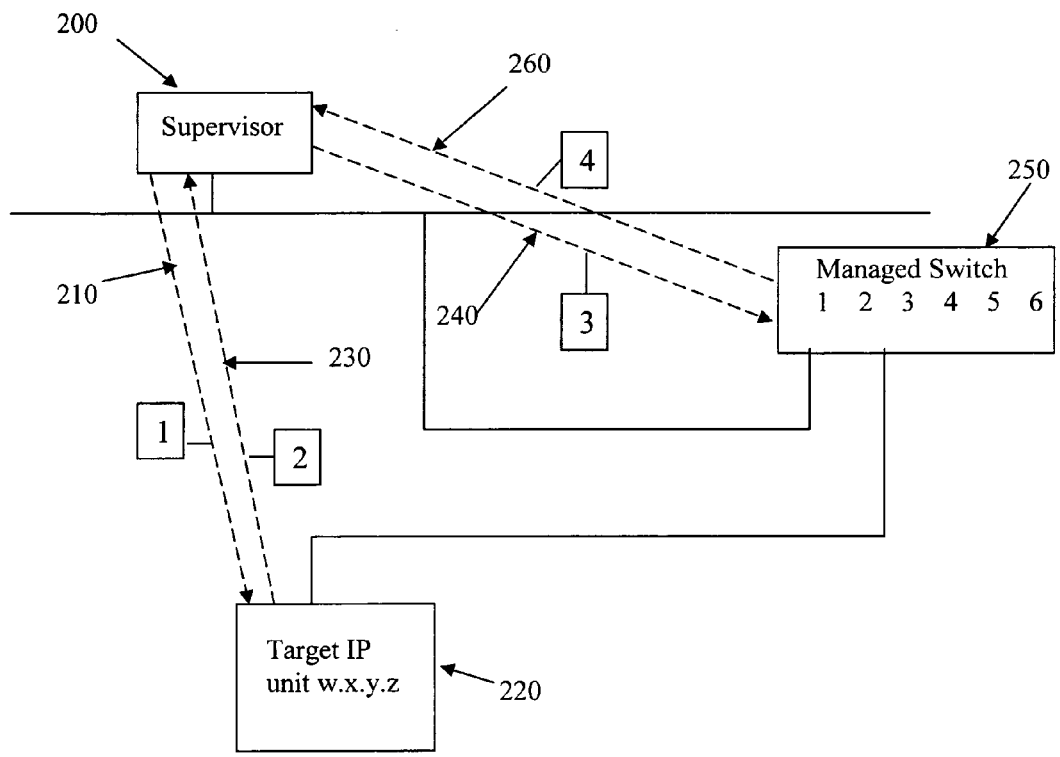
FIG. 3 Diagrammatic view of discovery/confirmation for dedicated port

The discovery/confirmation sequence finds the MAC address of targets and records the canonical location (numbered port of supervised switch) for a dedicated port scenario as shown in FIG. 3. The discovery sequence detects initial or new devices connected to the network and confirms the target locations. The supervisor/monitor agent 200 issues an ARP request 210 as a broadcast message to inquire the MAC address of the IP address. The target IP unit 220 receives the request and issues an ARP response 230 containing the MAC address of the requested IP address.

The supervisor 200 issues an SNMP Findport request 240 to the managed switch 250 to request the port number of the reported MAC address. The managed switch 250 issues an SNMP Findport response 260 back to the supervisor 200 with the port number of the MAC address. In FIG. 3, port number 3 would be returned to the supervisor.

Figure 4:
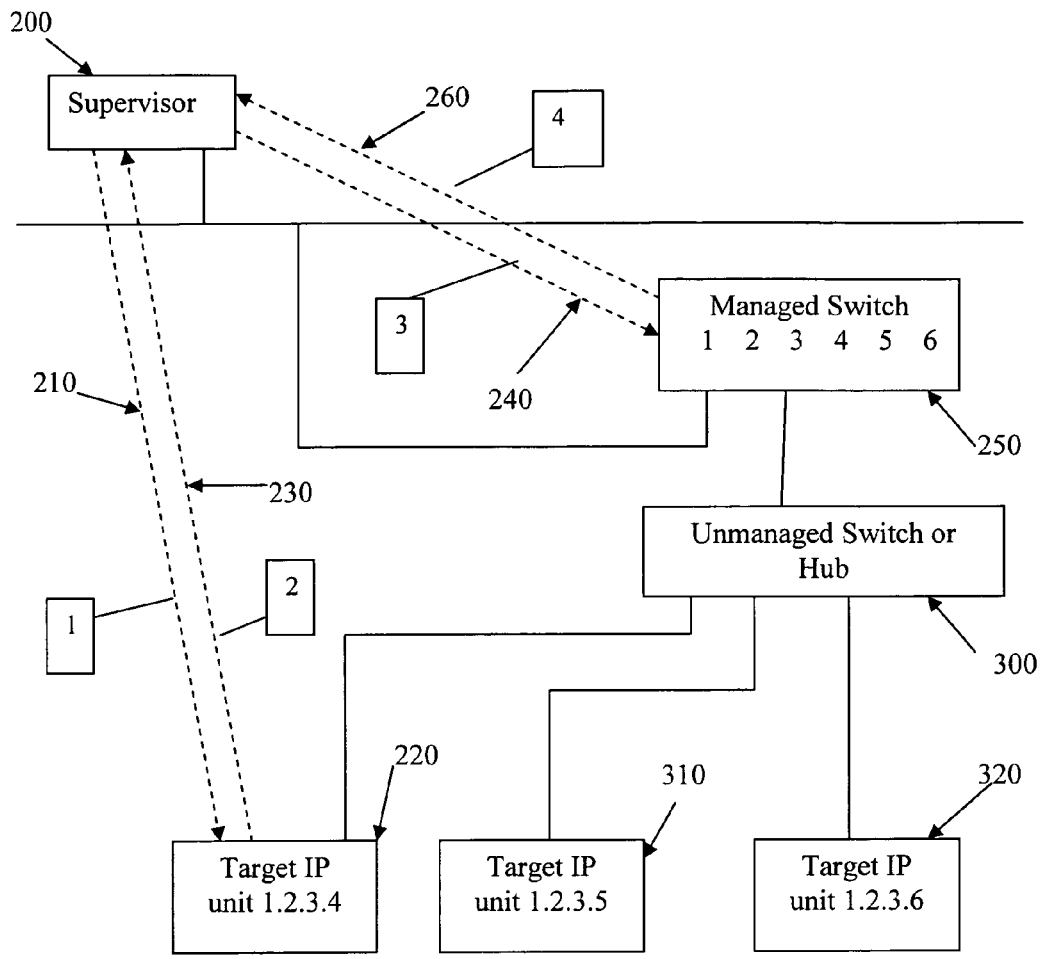
FIG. 4 Diagrammatic view of discovery/confirmation for shared port

FIG. 4 shows the discovery/confirmation sequence for the shared port scenario. In this embodiment, the supervisor 200 issues a broadcast ARP request 210 to inquire the MAC address of the selected IP address. The target IP unit 220 responds with an ARP response 230 containing the MAC address of the requested IP Address. The supervisor 200 then issues an SNMP Findport request 240 requesting the port number of the MAC address. The managed switch 250 issues an SNMP Findport response 260 back to the supervisor 200 with the port number of the MAC address. In FIG. 4, port number 3 would be returned to the supervisor.

However, the managed switch 250 connects to one or more unmanaged switches or hubs 300. Multiple target units 220, 310, 320 are connected to the unmanaged switch 300. Thus indicating port 3 of the managed switch indicates the target units 220, 310, 320 as sharing the managed switch 250 port 3. Automatic reallocation would be suppressed and further processing would be required to determine which of the target units 220, 310, 320 is down, if more than one of them were down at the time of attempted replacement.

Figure 5:
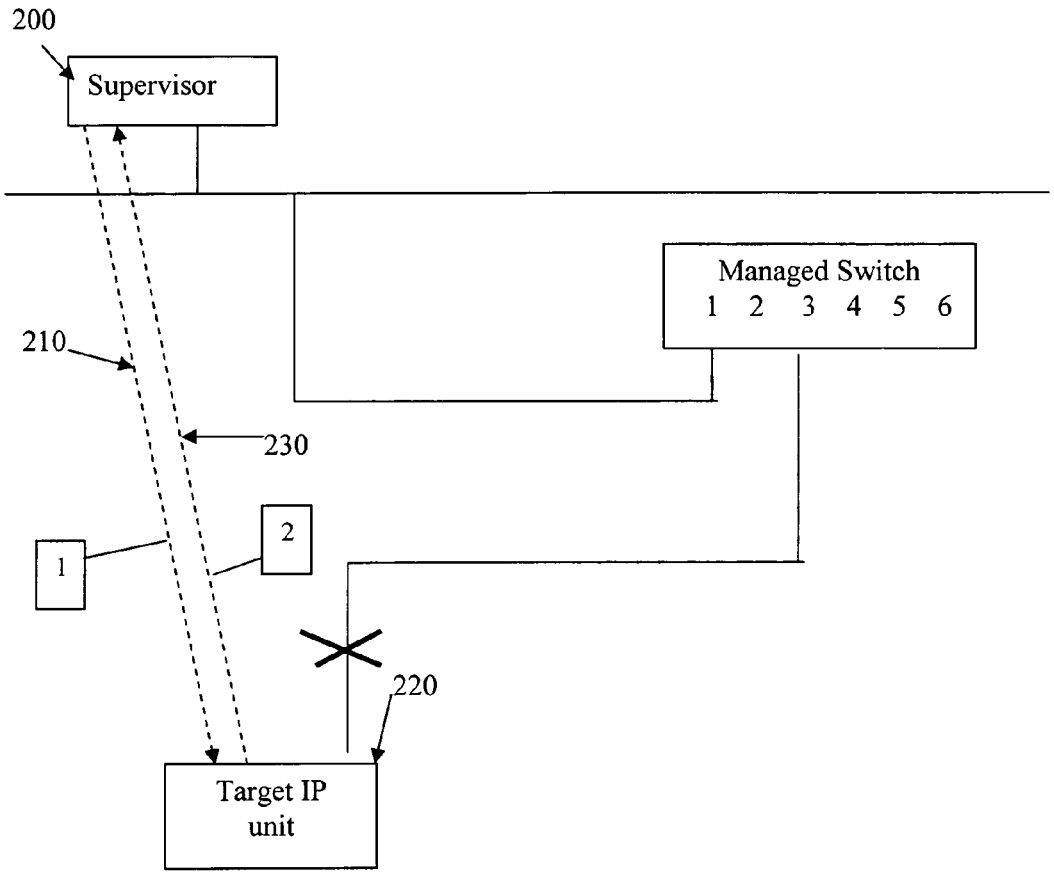
FIG. 5 Diagrammatic view of confirm presence for dedicated port

The confirm presence sequence interrogates the target units at periodic intervals, whereby a non-responsive unit indicates the target is 'down' or failed. In a dedicated port scenario such as shown in FIG. 5, a single target down in a canonical location becomes a reassignment candidate.

During the confirm presence process, the supervisor 200 issues an ARP request 210 as a unicast message to inquire the MAC address of a selected IP address. If the target IP unit 220 receives the request and returns an ARP response 230 containing the MAC address of the requested IP address, the unit is determined to be functioning. If there is no response, this indicates that the target IP unit 220 is down or failed. Such a failure isolates the reassignment candidate to a single unit for the maintenance personnel. Note that the supervisor can be programmed to perform the check a certain number of intervals over a certain period of time before determining the unit failed. Such repetition and time intervals are usually specific to the application, and it would be obvious to one skilled in the art to change the repetition or timing.

FIG. 6 shows the confirm presence sequence for the shared port scenario. In this embodiment, the supervisor 200 issues an ARP request (unicast) 210 to inquire the MAC address of the selected IP address. The target IP unit 220 responds with an ARP response 230 containing the MAC address of the requested IP Address. If no response is returned, the target unit 220 is down and selected for reassignment. If there is only a single target unit on the unmanaged switch or hub 300 for which a failure is indicated, then the single target unit is down and selected for reassignment. However, where there are multiple target units 220, 310, 320, and more than one of them is down, then the automatic reallocation is suppressed.

For example, the managed switch 250 connects to one or more unmanaged switches or hubs 300. Multiple target units 220, 310, 320 are connected to the unmanaged switch 300. Thus indicating port 3 of the managed switch 250 only indicates the target units 220, 310, 320 as sharing the managed switch 250 port. Additional processing is necessary to determine which target IP unit has failed.

The normal use of ARP request messages is to inquire the MAC address of a target whose MAC address is not known but whose IP address is known. In order to send a unicast message the sender must designate the MAC address of the target. The use of unicast ARP requests during the repetitive 'poll' of the device confirm whether the device is still alive. The choice of a unicast rather than a broadcast for this interrogation is important in large networks to avoid excessive use of broadcast traffic that will be perceived as needless interruption by all other stations.

Figure 7:
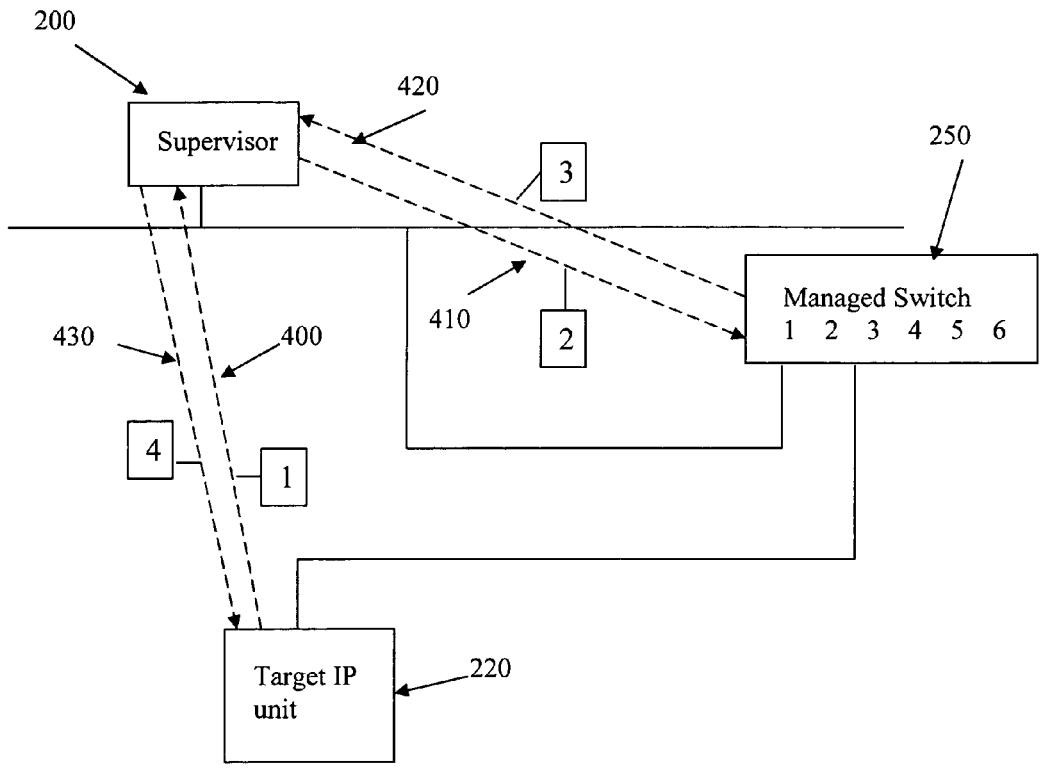
FIG. 7 Diagrammatic view of IP Address assignment

FIG. 7 shows the IP address assignment sequence to automatically issue an IP address to a target unit that was reset or power cycled, but otherwise previously running at that location. The target IP unit 220 automatically broadcasts a BOOTP request 400 to supply an IP address for the MAC address. The supervisor 200 receives the BOOTP broadcast and sends out an SNMP Findport request 410 to the managed switch 250, requesting the port number for the MAC address. The managed switch 250 responds with an SNMP Findport response 420 with the port number for the MAC address. In this example, the port number was 3 for the MAC address. The supervisor 200 checks if the MAC address was already associated with the IP address at that canonical location. If the MAC address matches the number which the supervisor 200 expected, the supervisor 200 issues a BOOTP response 430 and sends the IP address for the MAC address.

The IP address reassignment sequence is shown in FIG. 8. The target unit 440 was not previously running at that location, and issues a BOOTP request 400 as a broadcast message. The supervisor 200 receives the BOOTP request 400 and issues an SNMP Findport request 410 to find the port number of the MAC address. The managed switch 250 receives the request 410 and replies with an SNMP Findport response 420 that contains the port number of the MAC address. The supervisor 200 determines that the MAC address is unknown.

In the illustrated embodiment, a single unit 440 at that location is not responding. The supervisor 200 updates the equivalence table that links the IP addresses, and records the new IP assignment and authorizes the assignment. The supervisor 200 issues a BOOTP response 430 that sends the IP address to the requesting device at the new MAC address. It is assumed that the target unit 440 is an equivalent unit 440 and connected with the same cabling.

In operation, the management program/supervisor, as part of a routine periodic 'scan', determines the existence of the networked devices. The management program/monitor agent interrogates the network switch and determines the location of the devices on the network. The device is either a single device attached to a network switch port (on a fully switched layer 2 network) or being one of a limited number of devices localized to a single port on a switch. The hubs that are not managed are less expensive, but do not provide an exact resolution as to which port the devices within the hub are connected. This latter method is a more economical hybrid of managed switches and managed switches or hubs. In addition, the management program has authority to interrogate the devices in benign ways, such as PING or attempted Modbus/TCP connection, to confirm the identity of the device as far as the relationship between MAC address and IP address.

In practice, the interrogation is done by running a routine 'probe ' of the address space domain. For example, the management entity may issue a Modbus/TCP connection attempt to each device. Any station or device that acknowledges the connection request is recorded as being a potential address management candidate, and the details are recorded as follows:

1. The IP address is known and it was the one used in the probe.
2. MAC address is obtained by checking the local ARP table or by recording the source MAC address of the acknowledgement response.
3. Find switch and port assignment by comparing the MAC address with the most recent FindPort response record obtained from the switches on the network. Alternatively, the switch and port assignments are found by issuing an exploratory sequence of FindPort requests to the switches in the hierarchy. The values corresponding to the 'most local' switch to the device are recorded. This information is then used to prepare the BOOTP database as well as a MAC/location lookup table.

Once the device has been detected using the probe, it is added to a list of devices whose operability is to be continuously monitored. This may be done in a variety of ways such as checking on a frequent basis that the device is still responding, and confirming the MAC/location data. If a device is found to be unavailable, that physical switch/port combination will be monitored closely for reappearance of the same module or for a potential replacement operation. The unavailability can be logged according to a length of time or number of requests. An alerting signal can be issued to maintenance as part of the overall configuration.

Under most situations, such as a routine shutdown and restart of the plant area concerned, the original device will repeat its BOOTP request on powerup. The management entity will find a match of the requested MAC address in the BOOTP table, and will send back a BOOTP response to the device authorizing it to use the IP address previously recorded. Thus there is minimal delay on normal plant reset operations.

If a device needs to be replaced under field maintenance conditions, the device is replaced quickly and by a low-level technician or maintenance person. The replacement device is connected to the same network cable as the former unit, or at least, to the same port on the switch. It is important to note that the replacement device must be an equivalent unit to the failed unit and operate with the same functionality and command set.

Once the replacement unit powers up, it issues a BOOTP request, as dictated by the industry standards. There will not be any 'conventional ' BOOTP server with the MAC address of the device in its database, so there will not be any conventional BOOTP response. There will be no entry in the management entity's database. At this point the management entity will contact the switches which it is monitoring to find which one 'saw' the MAC address of the BOOTP request it just received. Of course, the switches it consults first are the ones that are known to have one or more 'missing' devices on the most recent update scan.

If a switch returns a match with the MAC address of the BOOTP request,

AND

The management entity confirms only a single device was missing from the set of devices monitored at that switch port

AND

The device appears to be similar to the device that was missing

AND

The device has not apparently been assigned an IP address already (for example, it has made multiple BOOTP requests)

THEN

The management entity will authorize the substitution of the single 'missing' IP address to the device now requesting. A BOOTP response is sent back (after the second or third BOOTP request, not the first) which the device will interpret in the normal way.

As a result of this automated field replacement, a single TCP/IP station is performed automatically, without manual configuration, and it is done in less than 15 seconds.

With respect to deliverable and management, the management entity running in one or more computers should be available 7 days a week×24 hours a day. The most natural such devices are the managed Ethernet switches themselves. They ordinarily are supplied with uninterruptible power, and are designed to have a very low likelihood of failure. In addition, because the present invention does not rely on a unique database, such as DHCP, there is no issue with two or three devices sharing the responsibility for network supervision.

The devices in turn would be configured in some convenient way, such as via an embedded Web server, to be advised of their ranges of IP address to monitor and if there are any special distinguishing characteristics of particular parts of the network. In particular, information such as the IP addresses of the switches to be supervised are most conveniently entered in this way, rather than having to be 'discovered' through network probing techniques. Most importantly, the configuration information is entered by personnel who have familiarity and authority to manipulate network addresses.

An additional embodiment allows direct entry to the management entity of the desired network address of a new module on a given switch port. This can be used as part of a controlled installation sequence, where the technician inputs the data one entry at a time, in step with powering on the modules. This avoids the need, common today, for the technician to record the MAC address from the module and enter it as part of a configuration sequence. Instead, the technician performs the following steps:

1. Select the switch and port to which he wants to attach the module
2. Confirm that there is no currently 'missing' module on that port
3. Enter the desired IP address as if it were a 'missing' module
4. Allow the newly attached module to power up.

This allows the single module to be assigned, and the technician can go on to the next maintenance task. This is much more convenient than any current technique in the industry.

The present invention works extremely well in environments where the location of a device can be determined accurately. For example, where a fully switched layer topology is used and there is an RFC 1493 management at the local switch allowing resolution to a single device on a port.

If, however, more than one device is 'down' on a network segment, and the address cannot be matched unambiguously, it is not safe to transform automatic address substitution in this manner. In such a situation, it is not known which of the multiple devices requires substitution.

This situation is improved at minimal increase in complexity by allowing the devices to alter one of the fields of the BOOTP request in such a way as to have a different 'signature' based upon device type. For example, all devices from a given manufacturer and family might share a code, but the code varies between, a 16-point discrete output module and a 4 channel analog input. By using this auxiliary information in its BOOTP equivalence table, the management entity is able to reduce the incidence of 'reassignment stall' situations. This technique would require cooperation and standardization in the industry to be effective.

One of the most obvious uses of the present invention is for devices without operator interfaces, such as industrial I/O modules. However, it can also be used to shorten the installation time for devices that do have such interfaces, but where the IP address that is to be assigned must be tightly controlled by a monitor agent.

For example, a 'thin client' computer to be used as an operator terminal can be configured to use BOOTP. In the event of failure, a unit could be disconnected and its replacement automatically assigned exactly the same IP address. This is important in two situations common to computers on industrial networks.

The first situation arises when the IP address is going to be validated by 'firewall' devices, which must be convinced of the legitimacy of the requester by its physical location. Most firewalls can be configured to allow connections to 'pass through' based upon rules involving the IP address or range of IP addresses of initiator and target.

A second situation arises when a thin client has an active role on the control network, and the act of replacing a device, and auto-assigning its address, allows the device to complete its 'application bootstrap' by being given its application program and operating parameters from some anonymous server. This is particularly valuable in a 'distributed control' environment where a component such as a PLC or gateway has failed, but could also apply to operator panels, robots, and similar devices.

Although BOOTP protocol is the most commonly used for automatic assignment of IP addresses, DHCP and RARP are obvious alternative protocols to respond to an address assignment request as described herein.

Similarly, the interrogation messages sent out by the device to confirm the continued presence of the target IP addresses can be either an 'ICMP ECHO' (PING) request or simply a repeat of the ARP request used to determine the identity in the first place. For efficiency purposes the interrogation message is restricted to the ARP message, the message is sent out as a unicast message, and sent only to the MAC address which the recipient used.

As will be realized, the invention is capable of other and different embodiments and its several details are capable of modifications in various obvious respects, all without departing from the essence of the invention.

I claim:

1. A method for determining a correct Internet Protocol (IP) address for network-connected devices, comprising:

receiving from a target device on the network a request to be assigned an IP address, the request including a Media Access Control (MAC) address associated with the target device;

issuing a query to one or more managed Ethernet switches on the network, each switch having a number of ports, where each query specifies the MAC address and requests that the queried managed Ethernet switch report the number of any port on which was received data sent by a device having the specified MAC address;

receiving replies to one or more of the queries;

in response to determining that one of the queried managed Ethernet switches and a port number reported by that switch corresponds to at least one known IP address, sending messages to each said target device indicated by said known IP address, so as to elicit a response for those devices currently in service;

if identifying a single known IP address not in service by lack of response, assigning that single known IP address to the target device; and if identifying that there is more than a single known IP address not in service, not assigning any IP address to the target device.

2. The method of claim 1 further comprising:

maintaining a database listing one or more devices connected to a network, wherein each listed device has an entry that includes an IP address associated with the listed device, an identity of a managed Ethernet switch to which the listed device is associated, and a port number of the managed Ethernet switch to which the listed device is associated.

3. The method of claim 2 wherein determining that one of the queried managed Ethernet switches and a port number reported by that queried managed Ethernet switch corresponds to a known IP address includes matching the one of the queried managed Ethernet switches and the port number reported by that queried managed Ethernet switch to an entry in the database, thereby identifying the IP address in that entry to be the known IP address.

4. The method of claim 1 wherein the one or more managed Ethernet switches each support find port queries as defined in Internet standard document RFC 1493.

5. The method of claim 1 wherein the target device's request to be assigned an IP address complies with the Bootstrap Protocol as defined in Internet standard document RFC 951.

6. The method of claim 1 wherein the target device's request to be assigned an IP address complies with the Dynamic Host Configuration Protocol (DHCP) as defined in Internet standard document RFC 1531.

7. The method of claim 1 wherein the queries to the one or more managed Ethernet switches complies with management protocol as defined in Internet standard document RFC 1493.

8. The method of claim 1 wherein each message sent is an ICMP ECHO or PING request.

9. The method of claim 1 wherein each message sent is a broadcast Address Resolution Protocol (ARP) request.

10. The method of claim 1 wherein each message sent is a unicast Address Resolution Protocol (ARP) request.

11. The method of claim 1 further comprising:

periodically polling devices connected to the network to determine whether the current status of each device is in service or not in service; and updating a database with the current status based on the polling.

12. The method of claim 11 wherein in response to determining that one of the queried managed Ethernet switches and a port number reported by that switch corresponds to more than one known IP address, the method further comprises:

consulting the database to identify known IP addresses not in service; and in response to determining that there is only a single known IP address not in service, assigning that known IP address to the target device.

13. The method of claim 11 wherein the polling includes:

sending messages to each device, so as to elicit a response from each of those devices currently in service, thereby identifying known IP addresses not in service by lack of response.

14. The method of claim 1 wherein assigning the known IP address to the target device includes sending a response to the target device, thereby indicating to the target device that an IP address has been allocated.

15. The method of claim 14 wherein both the target device's request to be assigned an IP address and the response to the target device complies with the Bootstrap Protocol as defined in Internet standard document RFC 951.

16. The method of claim 14 wherein both the target device's request to be assigned an IP address and the response to the target device complies with the Dynamic Host Configuration Protocol (DHCP) as defined in Internet standard document RFC 1531.

17. A method for determining a correct Internet Protocol (IP) address for network-connected devices, comprising:

maintaining a database listing one or more devices connected to a network, wherein each listed device has an entry that includes an IP address associated with the listed device, an identity of a managed Ethernet switch to which the listed device is associated, and a port number of the managed Ethernet switch to which the listed device is associated;

receiving from a target device on the network a request to be assigned an IP address, the request including a Media Access Control (MAC) address associated with the target device;

identifying the MAC address included in the request;

identifying managed Ethernet switches associated with devices connected to the network whose IP addresses are listed in the database, thereby identifying target managed Ethernet switches, each managed Ethernet switch having a number of ports and capable of reporting the port to which a device is attached in response to a find port query specifying that device's MAC address;

issuing a query to each of the target managed Ethernet switches, where each query specifies the identified MAC address and requests that the queried managed Ethernet switch report the number of any port on which was received a message sent by a device having the identified MAC address;

analyzing replies to each of the queries to determine if an entry in the database matches one of the queried managed Ethernet switches and the port number reported by that switch;

in response to at least one entry matching, sending messages to each said target device indicated by said entry matching, so as to elicit a response for those devices currently in service;

if identifying a single known IP address not in service by lack of response, assigning that single known IP address to the target device; and if identifying that there is more than a single known IP address not in service, not assigning any IP address to the target device.

18. A method for determining a correct Internet Protocol (IP) address for network-connected devices, comprising:

receiving from a target device on the network a request to be assigned an IP address, the request including a physical address associated with the target device, wherein the target device is a network computing device;

issuing a query to one or more managed Ethernet switches on the network, each switch having a number of ports, where each query specifies the physical address and requests that the queried managed Ethernet switch report the number of any port on which was received data sent by a device having the specified physical address;

receiving replies to one or more of the queries;

in response to determining that one of the queried managed Ethernet switches and a port number reported by that switch corresponds to a single known IP address, assigning that known IP address to the target device; and in response to determining that one of the queried managed Ethernet switches and a port number reported by that switch corresponds to more than one known IP address, not assigning any IP address to the target device.

19. The method of claim 18 further comprising:

periodically polling devices connected to the network to determine whether the current status of each device is in service or not in service;

and updating a database with the current status based on the polling.

20. The method of claim 19 wherein in response to determining that one of the queried managed Ethernet switches and a port number reported by that switch corresponds to more than one known IP address, the method further comprises:

consulting the database to identify known IP addresses not in service.

21. A method for determining a correct Internet Protocol (IP) address for network-connected devices, comprising:

receiving from a target device on the network a request to be assigned an IP address, the request including a physical address associated with the target device, wherein the request complies with at least one of the Internet standard RFC 951 Bootstrap Protocol and the Internet standard RFC 1531 Dynamic Host Configuration Protocol (DHCP);

issuing a query to one or more managed network switches on the network, such switches being distinct from hubs and routers, with each switch having a number of ports, where each query specifies the physical address and requests that the queried managed network switch report the number of any port on which was received data sent by a device having the specified physical address, wherein each query complies with management protocol as defined in Internet standard document RFC 1493;

in response to determining that one of the queried managed network switches and a port number reported by that switch corresponds to a single known IP address, assigning that known IP address to the target device;

in response to determining that one of the queried managed Ethernet switches and a port number reported by that switch corresponds to at least one known IP address, sending messages to each said target device indicated by said known IP address, so as to elicit a response for those devices currently in service; and if identifying a single known IP address not in service by lack of response, assigning that single known IP address to the target device; and if identifying that there is more than a single known IP address not in service, not assigning any IP address to the target device.

22. A method for determining a correct Internet Protocol (IP) address for network-connected devices, comprising:

receiving from a target device on the network a request to be assigned an IP address, the request including a physical address associated with the target device;

issuing a query to one or more managed network switches on the network, such switches being distinct from hubs and routers, with each switch having a number of ports, where each query specifies the physical address and requests the queried managed network switch to report the number of any port on which was received data sent by a device having the specified physical address;

receiving replies to one or more of the queries;

in response to determining that one of the queried managed Ethernet switches and a port number reported by that switch corresponds to at least one known IP address, sending messages to each said target device indicated by said known IP address, so as to elicit a response for those devices currently in service;

if identifying a single known IP address not in service by lack of response, assigning that single known IP address to the target device; and if identifying that there is more than a single known IP address not in service, not assigning any IP address to the target device.

23. The method of claim 22 wherein at least one of the managed network switches is connected to a hub having a number of hub ports.

24. The method of claim 23 wherein a plurality of devices are coupled to the hub ports, and the at least one managed network switch reports all MAC addresses and port assignments associated with the hubs and devices.

* * * * *

UNITED STATES PATENT AND TRADEMARK OFFICE
CERTIFICATE OF CORRECTION

PATENT NO. : 6,982,953 B1  Page 1 of 1
APPLICATION NO. : 09/614489
DATED : January 3, 2006
INVENTOR(S) : Andrew G. Swales It is certified that error appears in the above-identified patent and that said Letters Patent is hereby corrected as shown below:

Title page, please add
Item [56], References Cited
Insert -- 5,410,730  4/1995   Longsdorf et al. .........709/203 --
Insert -- 5,446,897  8/1995   Mathaia et al. ...........709/206 --
Insert -- 5,724,510  3/1998   Arndt et al. ..............709/217 --
Insert -- 5,838,907  11/1998  Hansen.....................709/217 --
Insert -- 5,917,808  6/1999   Kosbab.....................370/254 --
Insert -- 5,980,078  11/1999  Krivoshein et al. .......364/131 --
Insert -- 5,987,524  11/1999  Yoshida et al. ...........709/245 --
Insert -- 6,021,429  2/2000   Danknick ..................709/208 --

OTHER PUBLICATIONS please add
Insert -- POSTEL, J., "Internet Control Message", RFC0792, September 1981 --
Insert -- PLUMMER, D., "An Ethernet Address Resolution Protocol", RFC0826, November 1982 --
Insert -- FINLAYSON, R. et al., "A Reverse Address Resolution Protocol", RFC0903, June 1984 --
Insert -- CROFT, W. et al., "Bootstrap Protocol", RFC951, September 1985 --
Insert -- CASE, J. et al., "A Simple Network Management Protocol", RFC1157, May 1990 --
Insert -- DECKER, E. et al., "Definitions of Managed Objects for Bridges", RFC1493, July 1993 --
Insert -- DROMS, R. et al., "Dynamic Host Configuration Protocol", RFC2131, March 1997 --
Insert -- ALEXANDER, S., "DHCP Options and BOOTP Vendor Extensions", RFC2132, March 1997 --

Signed and Sealed this

Thirteenth Day of February, 2007

JON W. DUDAS
*Director of the United States Patent and Trademark Office*